(12) United States Patent
Cao et al.

(10) Patent No.: US 8,748,528 B2
(45) Date of Patent: Jun. 10, 2014

(54) VAPOR PERMEABLE BARRIER COATING APPLICABLE AT LOW TEMPERATURE

(75) Inventors: Xia Cao, Acton, MA (US); Robert A. Wiercinski, Lincoln, MA (US); Neal S. Berke, Chelmsford, MA (US); Antonio J. Aldykiewicz, Jr., Lexington, MA (US); Jyoti Seth, Andover, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 28 days.

(21) Appl. No.: 13/512,500

(22) PCT Filed: Nov. 18, 2010

(86) PCT No.: PCT/US2010/057148
§ 371 (c)(1),
(2), (4) Date: May 29, 2012

(87) PCT Pub. No.: WO2011/066160
PCT Pub. Date: Jun. 3, 2011

(65) Prior Publication Data
US 2012/0231170 A1  Sep. 13, 2012

Related U.S. Application Data

(60) Provisional application No. 61/265,159, filed on Nov. 30, 2009.

(51) Int. Cl.
*C08L 29/04* (2006.01)
(52) U.S. Cl.
USPC .......................................................... 524/503
(58) Field of Classification Search
USPC ........................................................... 524/503
See application file for complete search history.

(56) References Cited

U.S. PATENT DOCUMENTS

| | | | | |
|---|---|---|---|---|
| 4,146,672 | A | * | 3/1979 | Jasperson .................... 428/332 |
| 4,537,926 | A | * | 8/1985 | Kivel et al. .................. 524/388 |
| 4,859,723 | A | | 8/1989 | Kyminas et al. |
| 2004/0149174 | A1 | | 8/2004 | Farrington et al. |
| 2009/0294724 | A1 | * | 12/2009 | Attar .............................. 252/70 |

FOREIGN PATENT DOCUMENTS

| | | |
|---|---|---|
| WO | 2006076186 | 7/2006 |
| WO | WO 2006076186 A2 * | 7/2006 |

OTHER PUBLICATIONS

Henry Company, Technical Data Sheet "AIR_BLOC 07", dated Jun. 23, 2006, 3 pages.
Henry Company, Technical Data Sheet "AIR_BLOC 31", dated Jul. 15, 2002, 3 pages.
Helmut, Form PCT/ISA/210, International Search Report for PCT/US2010/057148, dated Nov. 3, 2011, 4 pages.
Helmut, Form PCT/ISA/237, Written Opinion of the International Searching Authority for PCT/US2010/057148, dated Nov. 3, 2011, 4 pages.

\* cited by examiner

*Primary Examiner* — Ling Choi
*Assistant Examiner* — Lanee Reuther
(74) *Attorney, Agent, or Firm* — Craig K. Leon

(57) ABSTRACT

Disclosed is a coating composition that includes an aqueous emulsion of a hydrophobic acrylic polymer, a water-soluble polymer, and an inorganic filler, and further includes a freezing-point lowering component to permit low temperature application. The freezing-point lowering component will preferably include a water-soluble, corrosion inhibiting salt. The coating composition will also optionally and preferably include an evaporation enhancing component to promote faster drying and skin formation at low temperatures. The coating composition may be coated onto a construction surface (e.g., by spraying) where, after drying, it will form a fully adhered barrier membrane that is water-vapor permeable, but air and liquid-water impermeable. Such membrane will preferably have sufficient coating thickness and sufficiently high elongation that it will bridge joints and cracks.

12 Claims, 2 Drawing Sheets

VAPOR PERMEABLE BARRIER COATING APPLICABLE AT LOW TEMPERATURE

CROSS-REFERENCE TO RELATED APPLICATION

This application is a 371 of PCT/US2010/057148, filed on Nov. 18, 2010, which claims the benefit of U.S. Provisional Application No. 61/265,159 filed on Nov. 30, 2009.

FIELD OF THE INVENTION

The present invention relates to an aqueous, liquid-applied coating composition that can be applied at low temperature and that dries to produce a water impermeable, water-vapor permeable, air barrier coating. The coating composition includes an emulsion of a hydrophobic acrylic polymer phase and a continuous water-soluble polymer phase, and further includes a freezing-point lowering component to permit low temperature application.

BACKGROUND OF THE INVENTION

Water-vapor permeable, air barrier coatings can be formed by applying a liquid coating composition onto a building construction surface. The liquid coating may be spray-applied, brushed, troweled or otherwise coated onto the target substrate, which may include a cementitious surface, such as cement, mortar, masonry, concrete, shotcrete, gypsum, gypsum board and gypsum sheathing, or some other building construction surface, such as wood, plywood, oriented strand board, fiberboard, particle board, rigid insulation, etc.

One product currently available from Henry Company, California, is sold under the trade name AIR-BLOC 07. This liquid product can be troweled or spray applied, then cures to form a coating that resists air leaking while remaining permeable to the passage of water vapor at 7 perms (or 400 ng/Pa.m$^2$.s) per ASTM E96 (Henry Technical Data sheet dated 06/23/06). The composition is a one-component solvent-based, SBR-modified bitumen and includes 1-5 parts Bentonite, 7-13 parts calcium carbonate, 10-30 parts of cellulose fiber, 1-5 parts of ethylene glycol, 10-30 parts of Stoddard solvent ($C_7$-$C_{12}$ hydrocarbon mixture) and other minor ingredients (Air-Bloc 07 MSDS issued at Nov. 10, 2008). The coating formed by this product is believed to have a hydrophilic domain or channel formed by cellulose fiber and Bentonite allowing passage of water-vapor through the coating. Although this solvent-based product can be applied as low as 10° F., the coating shows low elongation and poor crack bridging properties. Because this product is solvent-based, it has higher VOC (i.e. close to 250 g/L), thus raising environmental concerns and requiring special solvents to clean equipment after use. In addition, solvent-based products are incompatible with damp surfaces and require a fully dry surface prior to applying the product, which can be a challenge in a low temperature environment.

Another product available from Henry Company is sold under the trade name AIR-BLOC 31. This water-based composition can be spray-applied and cures to form a membrane that blocks air and air leakage and purportedly achieves a water vapor permeance of 12.3 perms (or 704 ng/Pa.m$^2$.s) under ASTM E-96 (Henry Technical Data Sheet dated Jul. 15, 2002). This product comprises about 65% total solids, wherein the solids comprise approximately 15 parts calcium carbonate (a typical filler), 35 parts wax (polyethylene or hydrocarbon wax; considered here to act as a filler because it does not form a film), and 50 parts vinyl acetate-acrylate copolymer. It is believed that this product has a microporous structure as a result of high filler level that exceeds the critical pigment volume concentration.

Another type of liquid coating composition for protecting exterior wall and roof surfaces is disclosed in U.S. Pat. No. 4,859,723. This water-based composition includes a water-dispersible polymeric binder (e.g., acrylic polymer) and pigment and filler material, including clay, such that the composition has a pigment volume concentration (PVC) greater than 15. These coating compositions are said to be suitable for application to bituminous built-up roofs, including hot mopped asphalt, and compositions with very low water permeability are considered especially useful. These compositions may include auxiliary agents such as preservatives, buffers, coloring agents, plasticizers, fire retardants, coalescents, disinfectants, and stabilizers (e.g., an anti-freeze material). However, the patentee suggests that the compositions should be applied at ambient temperatures of 50-100° F. (10-38° C.).

An improved water-based, liquid-applied vapor permeable membrane composition is disclosed in WO 2006/076186 and is sold under the tradename PERM-A-BARRIER® VP (W.R. Grace & Co.-Conn.). This membrane composition includes a water soluble polymer (e.g. PVOH), a hydrophobic acrylic polymer and a filler (and other minor components) to provide a water-vapor permeable air barrier membrane on a construction surface. The membrane has good flexibility and crack-bridging characteristics. As a water-based system, it is environmentally friendly and compatible with damp surfaces. However, it can not be used below freezing temperatures.

It is generally difficult to apply a liquid coating at low temperatures because the viscosity of the material increases as ambient temperatures decrease and the curing rate of the membrane slows down, potentially reducing the quality of the membrane produced. In addition, a water-based product cannot be applied below freezing temperatures because it will freeze. Freezing will also cause deterioration of coating properties.

It would be advantageous to provide a water-based, liquid-applied vapor permeable membrane composition that may be applied at low temperatures, particularly at temperatures below freezing (e.g., temperatures in the range of −10° C. to 0° C.), and that will dry to form a membrane film at such low temperatures.

SUMMARY OF THE INVENTION

The present invention is directed to a liquid coating composition that includes an aqueous emulsion of a hydrophobic acrylic polymer, a water-soluble polymer, and an inorganic filler, and further includes a freezing-point lowering component to permit low temperature application. The freezing-point lowering component will preferably include a water-soluble, corrosion inhibiting salt, particularly an inorganic salt. The coating composition will also optionally and preferably include an evaporation enhancing component to promote faster drying and skin formation at low temperatures. The coating composition may be coated onto a construction surface (e.g., by spraying) where, after drying, it will form a fully adhered barrier membrane that is water-vapor permeable, but air and liquid-water impermeable. Such membrane will preferably have sufficient coating thickness and sufficiently high elongation that it will bridge joints and cracks.

An exemplary membrane of the invention, formed by spraying the liquid coating composition onto a substrate surface, will preferably have an average dry thickness of 0.25-2.0 mm (10-80 mils), and will have a water vapor permeability of 1-50 perms, more preferably 5-35 perms (ASTM E-96).

At such thicknesses, membranes made from the coating compositions of the invention exhibit high elongation (preferably about 200% to about 1000%), which bestows excellent crack-bridging capabilities.

DETAILED DESCRIPTION OF THE INVENTION

Figure 1:
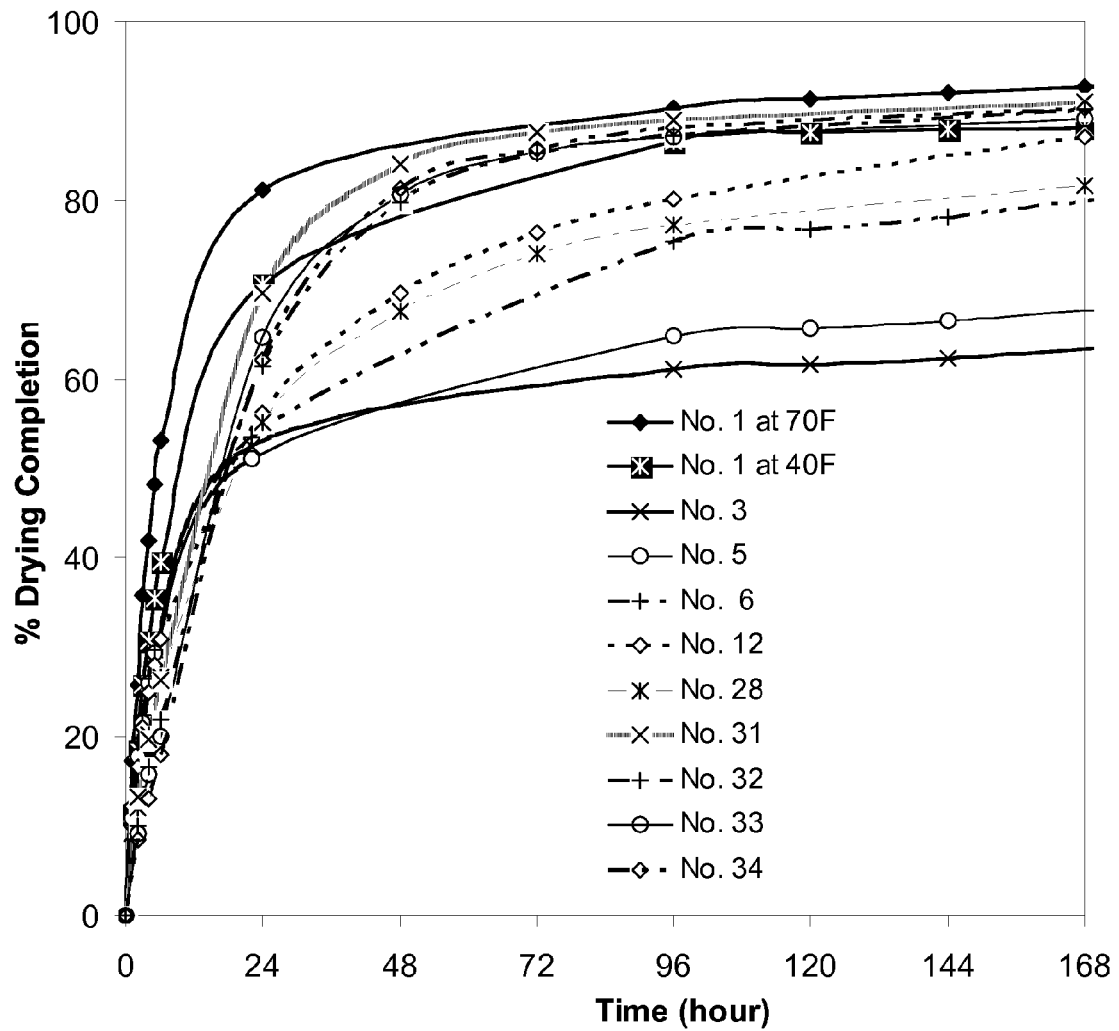
FIG. 1 is a graphic illustration of the degree of drying of certain compositions of the present invention.

In one embodiment, the present invention is directed to a liquid coating composition, useful for providing a water-vapor permeable, air barrier membrane on a construction surface. The liquid coating composition is an aqueous emulsion comprising a hydrophobic acrylic polymer, a water soluble polymer, an inorganic filler, and a freezing-point lowering component. The coating composition will also optionally and preferably include an evaporation enhancing component. Typically the liquid coating composition will comprise water in an amount of 30% to 50% by total weight of the liquid composition.

The hydrophobic acrylic polymer may be a homopolymer or a copolymer of an acrylic ester and will have a repeating group represented by the structure —($—CH_2—C(R^1)HCOOR$—)— wherein R is a $C_2$-$C_8$ alkyl group and $R^1$ is H or $CH_3$. Preferably, R represents an ethyl, propyl, butyl, octyl or ethyl hexyl group, and $R^1$ is H. More preferably, the hydrophobic acrylic polymer is a butyl acrylate polymer. The acrylic polymer may also comprise other monomers as well including, but not limited to, styrene, vinyl acetate, and vinyl chloride. A preferred acrylic polymer is a copolymer of butyl acrylate and styrene wherein the molar ratio of butyl acrylate/styrene is greater than 1, preferably greater than 1.5. Typically, the acrylic polymer will have a glass transition temperature of −55° C. to 0° C. The hydrophobic acrylic polymer may be present in an amount of about 50% to 97%, preferably about 60% to 90%, by weight based on total solids in the liquid composition.

The liquid coating composition additionally comprises a water-soluble polymer. The water-soluble polymer should be present in the liquid composition in an amount of 1% to 20%, preferably 3% to 17%, by weight based on total solids in the liquid composition. The level of water-soluble polymer is in addition to any water-soluble polymer that may be used as a protective colloid in the acrylic emulsion (if the emulsion is supplied by an emulsion manufacturer). Preferably, the water-soluble polymer will have a solution viscosity, at 4% by weight of the water-soluble polymer in water, of about 2 to 50 centipoise (cps).

Suitable water soluble materials may include polyvinyl alcohol (PVOH), polyethylene oxide (PEO), water soluble cellulosic polymers (e.g., hydroxypropyl methyl cellulose, hydroxyethyl cellulose), hydrolyzed maleic anhydride polymers and copolymers, polyvinylpyrrolidone, sulfonated polystyrene, polysulfoethyl acrylate, poly(2-hydroxyethylacrylate), polyacrylamide, poly(acrylic acid) and alkali metal salts thereof, natural or synthetically modified polysaccharides, proteins, alginates, xanthan gums, and guar gums. Preferred water soluble polymers include polyvinyl alcohol having a number average molecular weight of 5,000 to 50,000, polyethylene oxide having an average molecular weight of 5,000 to 200,000, and methyl ether or ethyl ether of cellulose having a number average molecular weight of 3,000 to 20,000. The use of low MW versions of these polymers insures that the liquid composition has a viscosity that is low enough to facilitate spraying of the liquid composition, and the weight fraction of water soluble polymer is high enough to insure high water vapor permeability.

The liquid coating composition may further comprise an inorganic filler in an amount of about 0-50%, preferably about 2-40%, and more preferably about 3-30%, by weight based on total solids in the liquid composition. Suitable inorganic filler materials include calcium carbonate, talc, clay, silica, titanium dioxide, wollastonite, mica, and vermiculite, and any other filler with a high aspect ratio that improves physical properties or influences barrier properties, and mixtures of two or more of these. The total amount of all inorganic filler in the liquid composition typically will provide a pigment volume concentration (PVC) of 1-25%, preferably 3-18%. The PVC may be computed by multiplying the volume of filler and other hard non-film forming ingredients by 100 and dividing this by the total volume of solids. Preferably, the amount of filler should be less than that required to exceed critical PVC so that the membrane is not microporous. Preferably, the filler material has an average particle size no less than 0.1 µm and no greater than 50 µm.

The liquid coating composition additionally comprises a freezing-point lowering component. This component will allow the aqueous product to be stored, applied and dried at temperatures below the freezing point of water. Conventional antifreeze materials such as methanol, ethylene glycol, propylene glycol, glycerol, and dimethyl sulfoxide (DMSO) are generally not suitable for this application because too large a quantity is needed, which may adversely affect the properties of the composition and, in some cases, can slow down the drying time at low temperature. The preferred freezing-point lowering component includes water-soluble metal salts, particularly water-soluble inorganic salts, more particularly water-soluble alkali and alkaline earth metal salts.

Suitable metal salts include water-soluble, alkali and alkaline earth (and rare earth) metal chlorides, nitrites and nitrates, for example, sodium chloride, potassium chloride, calcium chloride, magnesium chloride, calcium nitrite, calcium nitrate, sodium nitrite, cerium chloride, cerium nitrate, as well as calcium magnesium acetate (CMA), potassium formate, sodium silicate, etc. or a combination of two or more of these salts. Such salts may also be utilized in combination with conventional antifreeze materials. The amount of metal salt(s) in the liquid composition will generally comprise about 0.5-15%, preferably about 1-5% by weight of the total liquid composition (or about 1-10% by weight of total solids).

Preferred metal salts include alkali and alkaline earth metal nitrites since such salts inhibit corrosion. The metal nitrites may also provide some biocide activity and can be used at a relatively low amount when combined with an evaporation enhancing component, as described hereinafter. A most preferred metal salt is calcium nitrite or a combination of calcium nitrite with an alkali metal salt, such as sodium chloride. In the case where a combination of calcium nitrite with an alkali metal salt is used, preferably the ratio of calcium nitrite to alkali metal salt is about 1.5:1 to about 2.5:1, more preferably about 2:1. Most preferably, the amount of calcium nitrite, or calcium nitrite/alkali metal chloride, will comprise about 0.5-2% by weight of the total liquid composition.

A liquid coating composition applied on a building construction surface may require good corrosion resistance since the coating may come in contact with metal components in the building structure, such as steel ties. Metal component are susceptible to corrosion when exposed to moisture, and such corrosion can be exacerbated in the presence of sulfates, chlorides and similar anions that may be present in the water or in the coating that comes in contact with the metal component. Thus, it may be advantageous to include a corrosion inhibitor in the liquid coating composition. Nitrites are excellent corrosion inhibitors for steel. From an environmental, health and safety (EH&S) standpoint calcium salts are preferred over potassium and sodium. Other suitable corrosion inhibitors are molybdates (e.g. sodium molybdate), amines, sodium chromate, potassium chromate, calcium chromates, strontium chromate, sodium benzoate, zinc borate, or a combination of these inhibitors.

The liquid coating composition may optionally and advantageously include an evaporation enhancing component to facilitate faster drying of the coating composition to form a membrane film at low temperatures, particularly below normal freezing temperatures. A suitable evaporation enhancing component is a volatile organic solvent. Suitable volatile organic solvents include methanol, ethanol, xylene, diethylene glycol dibenzoate, styrenated phenol, oxybis-propanol, dibenzoate propanol, vinyl acetate, butyl acetate, ethyl acetate, methyl isobutyl ketone, methyl ethyl ketone, etc or a combination of two or more of these solvents. Preferred organic solvents are those that form an azeotrope with water. A most preferred volatile organic solvent is ethanol. The amount of volatile organic solvent in the liquid coating composition will generally comprise about 0-20%, preferably about 0.5-15%, more preferably about 0.5-5%, by weight of the total liquid composition. Preferably, the VOC of the liquid composition will be less than 150 g/l, more preferably less than 50 g/l, most preferably less than 25 g/l.

The liquid coating composition may also include other optional ingredients, as desired, including colorants or pigments (to impart color to the membrane), rheology modifiers, antioxidants, LTV stabilizers, antifoam agents, and biocides.

The liquid coating composition may be spray-coated, brushed, troweled, or otherwise coated onto the target substrate, which is typically a building construction surface. Substrates include cementitious surfaces (e.g., cement, mortar, masonry, concrete, shotcrete, gypsum) as well as gypsum board, and other porous structures such as wood or plywood. Upon drying, the coating composition will form an adherent membrane film on the substrate.

Accordingly, the present invention provides a method for coating a substrate surface, such as gypsum board, structures made of cement, masonry, or concrete, or structures made of wood, comprising applying the liquid coating composition to the substrate surface (e.g., by spray coating) and allowing it to dry. The present invention also pertains to composite structures formed by coating such substrates surfaces with the afore-mentioned coating compositions.

The present invention also provides a low temperature additive composition comprising an aqueous solution of freezing-point lowering component (as described above), and optionally containing evaporation enhancing component (as described above). This additive composition may be added to a conventional aqueous, liquid-applied coating composition on site, prior to application of the coating composition to a substrate surface, in order to render the coating composition suitable for below freezing application. This concentrated, aqueous additive composition will comprise, by weight, about 5 to 30% of the freezing-point lowering component (e.g. calcium nitrite) and about 10 to 60% of the evaporation enhancing component (e.g., ethanol), if the latter is present. Of course, other optional and desirable components (e.g., pH adjusters, biocidal agents, defoamers, etc.) may be included as desired.

Further advantages and features of the invention are described in further detail in the examples that follow, which examples are provided for illustrative purposes only. As will become evident, the inclusion of calcium nitrite in the liquid coating composition provides a lower freezing point (making application possible below normal freezing temperatures), increased vapor permeability, and reduced corrosion. The optional and preferred inclusion of ethanol speeds drying time and reduces the amount of calcium nitrite needed to lower the freezing point (i.e., ethanol and calcium nitrite act synergistically to lower the freezing point). In addition, the inclusion of an alkali metal salt, such as sodium chloride, in combination with calcium nitrite, enables the use of lower amounts of ethanol to enhance drying time at low temperatures while providing the liquid coating composition with a lower, more desirable, VOC and a higher flash point (i.e., lower flammability).

Example 1

This example illustrates the effect of the freezing-point lowering component (e.g., calcium nitrite and/or sodium chloride or CMA or sodium silicate), optionally with evaporation enhancing component (e.g., ethanol) and the ability of the liquid coating composition to dry and form quality film on a construction surface (e.g., DensGlass and concrete masonry unit (CMU)). Various liquid coating compositions are illustrated in Table 1. All the component amounts are expressed in terms of weight percentage of the total liquid mixture unless otherwise indicated. The acrylic polymer is BASF ACRONAL S400 (solid content 57%). The PVOH is Celvol 203S (Celanese). The "filler" identified in the Table includes the inorganic filler (e.g., titanium dioxide) plus other minor components such as pH adjusters, rheology modifiers, antioxidants, UV stabilizers, antifoam agents, pigments and biocides.

The coating composition without low temperature additives (i.e. formulation no. 1) could not be applied below the freezing point of water because it solidified. Additionally, this composition coagulated after it was brought back to a temperature above 0° C. (32° F.) (thawing) and was not able to form a good quality membrane. Based on this observation, even if the composition is able to be applied at a temperature just above 0° C. (32° F.), it may not be able to form quality membrane if the temperature drops below 0° C. (32° F.) before the composition dries. When the liquid coating composition is modified by the addition of the conventional antifreeze propylene glycol (formulation no. 2), this composition does not freeze at −7° C. (20° F.). However, it would not dry at the desired wet thickness of 2.2 mm (90 mil) to form a solid membrane after 2-3 weeks at −7° C. (20° F.). Thus, this formulation would not be suitable for outdoor construction applications.

As can be seen from Table 1, the addition of salts like sodium chloride, calcium nitrite, calcium magnesium acetate (CMA), sodium silicate and combinations thereof can prevent freezing at −7° C. (20° F.). The actual dosage varies depending upon the type of additive(s). For example, calcium nitrite, when used alone, may need to be present in an amount of about 4% (by weight of total solution) to provide effective freezing-point lowering properties, but a lower amount of total salts can be used when combined with sodium chloride or ethanol. Compare no. 41 to nos. 44, 32 and 34, for example. These compositions will also dry in a reasonable time to form acceptable membranes, as further described hereinafter.

TABLE 1

Formulations

| No | Acrylic latex | polyvinyl alcohol | Filler | Water | Calcium nitrite | Sodium chloride | Sodium silicate | CMA | Ethanol | Propylene Glycol | Freeze at 20 F. |
|---|---|---|---|---|---|---|---|---|---|---|---|
| 1 | 74.09 | 4.92 | 5.26 | 15.73 | | | | | | | Yes |
| 2 | 61.31 | 4.07 | 4.36 | 13.02 | | | | | | 17.25 | No |
| 3 | 64.43 | 4.27 | 4.58 | 13.68 | 13.04 | | | | | | No |
| 41 | 64.75 | 4.30 | 4.60 | 22.23 | 4.13 | | | | | | No |
| 40 | 66.27 | 4.40 | 4.71 | 21.05 | 3.58 | | | | | | Yes |
| 39 | 68.10 | 4.52 | 4.84 | 19.79 | 2.76 | | | | | | Yes |
| 38 | 69.98 | 4.64 | 4.97 | 18.52 | 1.89 | | | | | | Yes |
| 11 | 67.35 | 4.47 | 4.79 | 14.30 | | 9.09 | | | | | No |
| 44 | 68.77 | 4.56 | 4.89 | 18.20 | 1.79 | 1.79 | | | | | No |
| 42 | 71.28 | 4.73 | 5.06 | 17.00 | 0.96 | 0.96 | | | | | Yes |
| 43 | 70.66 | 4.69 | 5.02 | 17.78 | 0.48 | 1.38 | | | | | No |
| 5 | 61.74 | 4.10 | 4.39 | 13.11 | 12.50 | | | | 4.17 | | No |
| 4 | 59.27 | 3.93 | 4.21 | 12.58 | 12.00 | | | | 8.00 | | No |
| 7 | 61.74 | 4.10 | 4.39 | 13.11 | 8.33 | | | | 8.33 | | No |
| 6 | 64.43 | 4.27 | 4.58 | 13.68 | 4.35 | | | | 8.70 | | No |
| 24 | 59.41 | 3.94 | 4.22 | 20.40 | 4.01 | | | | 8.02 | | No |
| 32 | 66.82 | 4.43 | 4.75 | 17.69 | 1.80 | | | | 4.51 | | No |
| 31 | 63.94 | 4.24 | 4.54 | 16.93 | 1.73 | | | | 8.63 | | No |
| 37 | 72.28 | 4.80 | 5.14 | 16.32 | 0.49 | | | | 0.98 | | Yes |
| 13 | 61.74 | 4.10 | 4.39 | 13.11 | | 8.33 | | | 8.33 | | No |
| 21 | 67.35 | 4.47 | 4.79 | 14.30 | | 4.55 | | | 4.55 | | No |
| 12 | 64.43 | 4.27 | 4.58 | 13.68 | | 4.35 | | | 8.70 | | No |
| 17 | 66.15 | 4.39 | 4.70 | 14.05 | | 1.79 | | | 8.93 | | No |
| 27 | 64.43 | 4.27 | 4.58 | 13.68 | | | | 4.35 | 8.70 | | No |
| 28 | 69.24 | 4.59 | 4.92 | 14.70 | | | | 1.87 | 4.67 | | No |
| 26 | 66.15 | 4.39 | 4.70 | 14.05 | | | | 1.79 | 8.93 | | No |
| 22 | 64.43 | 4.27 | 4.58 | 13.68 | | | 4.35 | | 8.70 | | No |
| 23 | 66.15 | 4.39 | 4.70 | 14.05 | | | 1.79 | | 8.93 | | Yes |
| 29 | 66.22 | 4.39 | 4.70 | 17.53 | 1.79 | 0.89 | | | 4.47 | | No |
| 25 | 63.39 | 4.21 | 4.50 | 16.78 | 1.71 | 0.86 | | | 8.56 | | No |
| 34 | 70.60 | 4.68 | 5.02 | 16.84 | 0.95 | 0.95 | | | 0.95 | | No |
| 33 | 69.94 | 4.64 | 4.97 | 16.68 | 0.94 | 0.94 | | | 1.89 | | No |
| 30 | 68.01 | 4.51 | 4.83 | 16.22 | 0.92 | 0.92 | | | 4.59 | | No |
| 36 | 71.93 | 4.77 | 5.11 | 16.24 | 0.49 | 0.49 | | | 0.97 | | No |

Since the product is designed to be a vapor permeable air barrier, its vapor transmission was investigated as well. In addition, salt leaching was investigated. Small molecules like sodium chloride can leach out easily from the formed membrane, especially at high dosage, e.g. formulations with 4.35-9.09% sodium chloride in the composition (formulation nos. 11-13). When sodium chloride was used at lower dosage (i.e., lower than 1% of total liquid composition weight) combined with calcium nitrite (formulation nos. 25, 29, 30, 33, 34 and 36), there was no salt leaching out.

To investigate the drying time of the composition at −7° C. (20° F.), non-freezing compositions were evaluated at −7° C. (20° F.) for degree of drying vs. time. The results were compared to the composition without freezing-point lowering component (i.e. formulation no. 1) at normal temperature, e.g. 21° C. (70° F.), and low temperature but above freezing point, e.g. 4° C. (40° F.). All the tests were carried at well controlled temperature and 50% RH. Each sample was prepared in a 175 mm (3 in) plastic container at 2.3 mm (90 mil) wet thickness and the weight change was recorded over time. The percent of drying completion was calculated by the equation below.

$$\text{Percent of drying completion (\%)} = \frac{(\text{initial weight} - \text{weight at time } t) * 100}{(\text{initial weight}) * (\text{theoreticla weight fraction of total volatiles})}$$

For the low temperature compositions, the materials and testing container were preconditioned at −7° C. (20° F.) prior to testing. The results are graphically illustrated in FIG. 1.

The drying rate greatly depends on the property of additives and amount of ethanol in the composition. Formulation nos. 31-34 achieve a similar degree of drying compared to the unaltered regular composition (i.e. formulation no. 1) at 21° C. (70° F.) and 4° C. (40° F.) in FIG. 1. The formulations with high salt levels (e.g. formulation nos. 3 and 5 with more than 12% salt by total composition weight) dry slower, probably because the salt may raise the boiling point and decrease the volatility of the solvent (water). The composition with propylene glycol could not dry for weeks at −7° C. (20° F.) (not shown in FIG. 1).

Example 2

The effect of freezing-point lowering component, optionally with evaporation enhancing component, on water vapor permeability and elongation of membrane formed from the liquid coating composition were tested and compared to the composition with no additives (i.e. formulation no. 1). The liquid composition was applied by drawdown bar at 2.2 mm (90 mil) wet thickness and tested per ASTM D412 for elongation and ASTM D96 method B for water vapor permeability. All the formulations (except formulation no. 1) were preconditioned before application and cured at −7° C. (20° F.). The unaltered composition (i.e. formulation no. 1) was preconditioned and cured at 21° C. (70° F.) to provide a membrane with vapor permeability of 15 perm and elongation of 419%. The results of the test formulations compared to formulation no. 1 are summarized in Table 2. It is noted that vapor permeability increases with the addition of additives. Depending on the level and properties of the additives, the tested compositions demonstrate increases in permeability from 8 to 16.6 perm over that of formulation no. 1. Elongation values are 61.4% to 355.5%, respectively.

TABLE 2

Effect of low temperature additive on permeability and elongation

| Formulation ID | Composition | | | | | | | Peremeability | Elongation (%) |
| --- | --- | --- | --- | --- | --- | --- | --- | --- | --- |
| | Acrylic latex | PVOH | Filler | Water | Ca(NO2)2 | Nacl | Ethanol | change comapred to No 1 (perm) | |
| 1 | 74.09 | 4.92 | 5.26 | 15.73 | | | | | 419.3 |
| 3 | 64.43 | 4.27 | 4.58 | 13.68 | 13.04 | | | | |
| 6 | 64.43 | 4.27 | 4.58 | 13.68 | 4.35 | | 8.70 | 8.3 | 61.4 |
| 12 | 64.43 | 4.27 | 4.58 | 13.68 | | 4.35 | 8.70 | 16.6 | 274.4 |
| 13 | 61.74 | 4.10 | 4.39 | 13.11 | | 8.33 | 8.33 | 12.8 | 253.0 |
| 30 | 68.01 | 4.51 | 4.83 | 16.22 | 0.92 | 0.92 | 4.59 | 9.7 | 337.7 |
| 32 | 66.82 | 4.43 | 4.75 | 17.69 | 1.80 | | 4.51 | 11.8 | 269.3 |
| 33 | 69.94 | 4.64 | 4.97 | 16.68 | 0.94 | 0.94 | 1.89 | 8.0 | 348.4 |
| 34 | 70.60 | 4.68 | 5.02 | 16.84 | 0.95 | 0.95 | 0.95 | 11.0 | 355.5 |

Example 3

Two tests were conducted to investigate the effectiveness of various low temperature additives on corrosion resistance of a metal surface in contact with the coating. One test is an electrochemical test conducted on zinc-coated steel, which is a typical metal used in construction. This test involves an electrochemical impedance spectroscopy (EIS) measurement made in 0.5N sodium sulfate with 1N sulfuric acid to get pH 4 for ranking membrane formed from different compositions.

The other test is an assembly of the liquid coating composition coated onto Gypsum sheathing (e.g. DensGlass Gold from Georgia Pacific) with zinc-coated steel attached to mimic actual materials performance. The edge of metal was cut to expose the steel and the whole assembly was placed in an environmental room at 21° C. (70° F.) and 100% RH to accelerate the corrosion. The assembly was taken out after two weeks and the zinc-coated steel surface was inspected for corrosion compared to original surface.

The results summarized in Table 3 indicate that zinc-coated steel coated with the liquid coating composition containing only calcium nitrite has the lowest conductance value, corresponding to the lowest corrosion rate (conductance is the inverse of the polarization resistance calculated from the electrochemical impedance measurements). This result is in good agreement with the acceleration study at 100% RH, where no visual corrosion was observed. The composition with only sodium chloride exhibited severe corrosion in the accelerated corrosion test. The composition containing calcium nitrite and sodium chloride in a 2:1 ratio exhibited greatly reduced corrosion on metal, similar to the unaltered composition without salt, i.e. formulation no. 1. The results indicate that calcium nitrite not only inhibits corrosion by itself, but also retards the corrosion normally resulting from sodium chloride.

TABLE 3

The effect of low temperature additive on corrosion

| No | Composition | | | | | | | | | | Conductance (Siemens) | Accelerated Corrosion (Two weeks in RH 100%) |
| --- | --- | --- | --- | --- | --- | --- | --- | --- | --- | --- | --- | --- |
| | Acrylic latex | polyvinyl alcohol | Filler | Water | Calcium nitrite | Sodium chloride | Sodium silicate | CMA | Ethanol | Propylene Glycol | | |
| 1 | 74.09 | 4.92 | 5.26 | 15.73 | | | | | | | 5.3E−03 | Light |
| 12 | 64.43 | 4.27 | 4.58 | 13.68 | | 4.35 | | | | 8.70 | 3.0E−03 | Severe |
| 17 | 66.15 | 4.39 | 4.70 | 14.05 | | 1.79 | | | | 8.93 | 3.3E−03 | Severe |
| 22 | 64.43 | 4.27 | 4.58 | 13.68 | | | 4.35 | | | 8.70 | 4.5E−03 | Light |
| 24 | 59.41 | 3.94 | 4.22 | 20.40 | 4.01 | | | | | 8.02 | 8.8E−04 | Not observed |
| 25 | 63.39 | 4.21 | 4.50 | 16.78 | 1.71 | 0.86 | | | | 8.56 | — | Light |
| 27 | 64.43 | 4.27 | 4.58 | 13.68 | | | | 4.35 | | 8.70 | 3.5E−03 | Light |

Example 4

Figure 2:
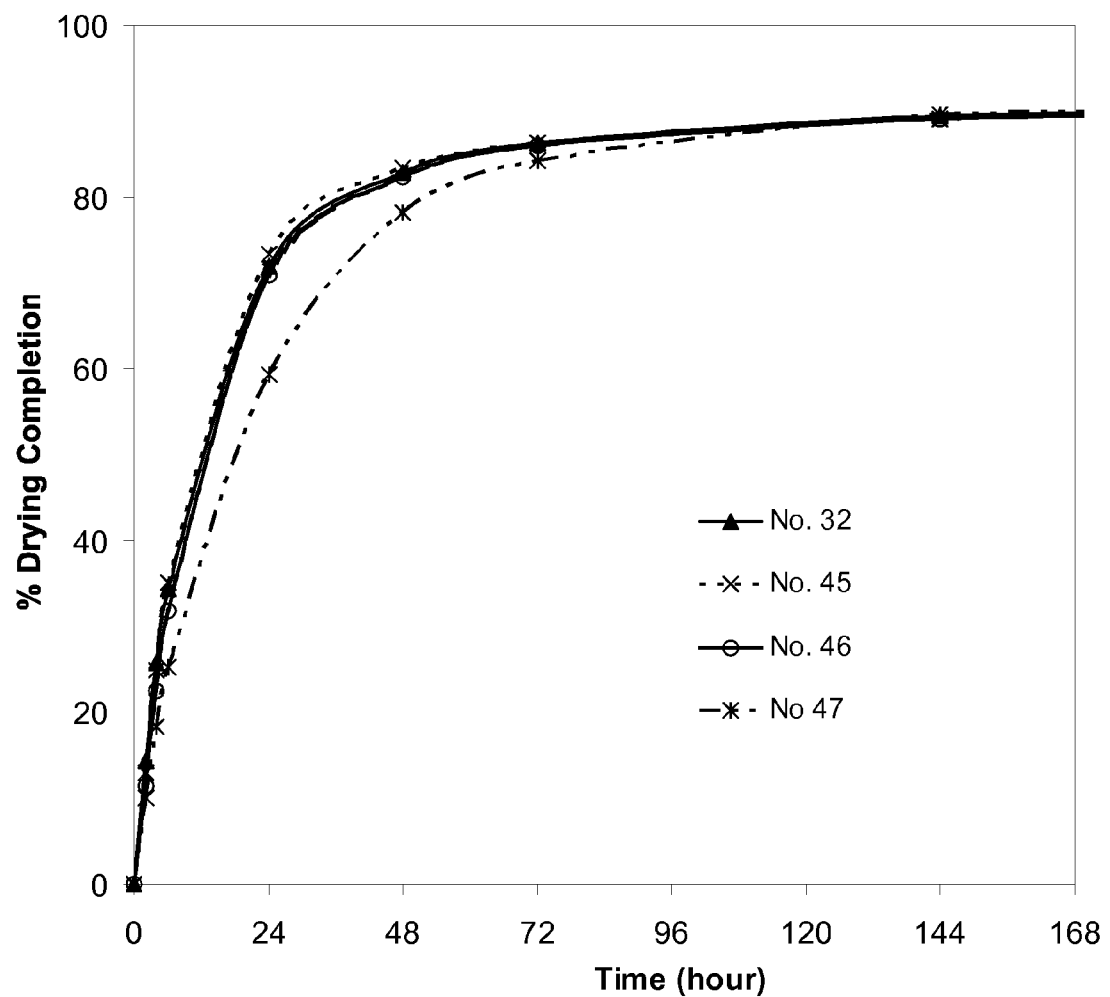
FIG. 2 is a graphic illustration of the degree of drying of certain compositions of the present invention.

Various compositions were tested for freezing-point lowering, drying at low temperature, VOC and flash point. The results are summarized in Table 4 and FIG. 2. The results indicate that equivalent drying rate and freezing point depression can be achieved at low ethanol levels by utilizing a mixture of calcium nitrite and sodium chloride in a 2:1 ratio (this ratio was selected based on the corrosion study in Example 3). This composition also has the additional benefit of very low VOC and high flash point, which permits use without special equipment and personal protection equipment.

TABLE 4

Formulations for VOC and Flash Point Study

| No | Acrylic latex | polyvinyl alcohol | Filler | Water | Calcium nitrite | Sodium chloride | Ethanol | Freeze at 20 F. | VOC (g/l) | Flash Point C. (F.) |
|---|---|---|---|---|---|---|---|---|---|---|
| 32 | 66.82 | 4.43 | 4.75 | 17.69 | 1.80 | | 4.51 | No | 113 | 42(108) |
| 37 | 72.28 | 4.80 | 5.14 | 16.32 | 0.49 | | 0.98 | Yes | | |
| 45 | 67.89 | 4.50 | 5.05 | 17.97 | 1.83 | 0.92 | 1.83 | No | | |
| 46 | 68.52 | 4.55 | 5.10 | 18.14 | 1.85 | 0.92 | 0.92 | No | 15 | 66(151) |
| 47 | 70.10 | 4.65 | 5.22 | 16.72 | 0.95 | 0.47 | 1.89 | No | | |
| 48 | 70.77 | 4.69 | 5.27 | 16.88 | 0.95 | 0.48 | 0.96 | Yes | | |

Example 5

To provide flexibility to adjust to temperature changes in the field, the feasibility of adding low temperature additives as a single additive package into a regular, unaltered liquid coating composition (i.e. formulation no 1 in Table 1, Part A) was investigated. Base formulation no 32 was picked for investigation purpose. Low temperature package (Part B) contains calcium nitrite solution (35%)/ammonium hydroxide/ethanol at weight ratio of 52.83/2.25/44.92. For purpose of preparing this formulation, calcium nitrite solution was obtained from Grace Construction Products under the trade name DCI®, while industrial grade ethanol or denatured alcohol was obtained from Dow (SYNASOL™ solvent 200 Proof PM-509). Ammonium hydroxide was used to adjust the system pH above 8 and was obtained from National Ammonia. Part B is mixed into Part A, which can be used at temperature above 4° C. (40° F.) alone, at a weight ratio of Part A:Part B of 90:10 and stored at −7° C. (20° F.) prior to spraying for property testing. As a comparison, Part A was sprayed at normal environmental temperature around 23° C. (73° F.) and tested. Both products were applied at 2.2 mm (90 mil) wet thickness without sag observed. After 7 days cure, the samples were tested per ASTM D412 for elongation, ASTM D96 method B for water vapor permeability and ASTM E2178-03 for air permeance. The samples sprayed on CMU were tested for 90 degree peel adhesion at 50 mm/min. (2"/min) after 7 days cure.

The results, summarized in Table 5 below, indicate similar performance except increased vapor transmission for the low temperature formulation (Part A mixed with Part B), which results from the salt additive.

TABLE 5

| | Part A mixed with Part B at 20 F. | Part A at 73 F. |
|---|---|---|
| Tensile strength (psi) | 372.68 | 397.71 |
| Elongation (%) | 534.22 | 385.48 |
| Vapor transmission (perm) | 32.36 | 15.35 |
| Peel adhesion on CMU (pli) | 35.93 | |
| Air permeance at 75 Pa (L/s/m2) | 0.001 | 0.001 |

The preferred liquid coating composition of formulation no. 32, shown in Tables 1, 2 and 4, may be applied below freezing temperatures because it exhibits good freezing-point lowering and acceptable drying time at low temperature. It also has acceptable VOC and flash point for low temperature application and provides a membrane having good flexibility and corrosion resistance. The low temperature additives can be premixed into the formulation or the additives can be packaged separately and mixed with the normal, unaltered coating composition on-site for low temperature application.

Other preferred formulations include formulation nos. 34 and 46, which also provide good freezing-point lowering and acceptable drying time at low temperature with minimized VOC, high flash point and provides a membrane having good flexibility and corrosion resistance.

The invention claimed is:

1. A liquid coating composition useful for providing a water-vapor permeable, air barrier membrane by coating on a construction surface, the liquid coating composition being an aqueous emulsion, comprising:
   a hydrophobic acrylic polymer, wherein the hydrophobic acrylic polymer comprises about 50% to 97% by weight based on total solids in the liquid composition, the hydrophobic acrylic polymer comprising a homopolymer or a copolymer of an acrylic ester having a repeating group represented by the structure —(—CH$_2$—C(R$^1$)HCOOR—)— wherein R is a C2-C8 alkyl group and R$^1$ is H or CH$_3$;
   a water soluble polymer, wherein the water-soluble polymer comprises about 1% to 20% by weight based on total solids in the liquid composition, and wherein the water-soluble polymer comprises polyvinyl alcohol, polyethylene oxide, water soluble cellulosic polymers, hydrolyzed maleic anhydride polymers and copolymers, polyvinylpyrrolidone, sulfonated polystyrene, polysulfoethyl acrylate, poly(2-hydroxyethylacrylate), polyacrylamide, poly(acrylic acid) and alkali metal salts thereof, natural or synthetically modified polysaccharides, proteins, alginates, xanthan gums, or guar gums, or combinations of two or more of such water soluble polymers;
   an inorganic filler, wherein the inorganic filler comprises about 2-40% by weight based on total solids in the liquid composition;
   a freezing-point lowering component comprising a water-soluble metal salt, wherein the water-soluble metal salt comprises about 0.5-15% by weight of the total weight of the liquid composition, said water-soluble metal salt comprising calcium nitrite, sodium nitrite, or a mixture thereof; and
   an evaporation enhancing agent in an amount of about 0.5-15% by weight of the total weight of the liquid composition, the evaporation enhancing agent comprising at least one solvent selected from methanol, ethanol, oxybis-propanol, vinyl acetate, butyl acetate, ethyl acetate, methyl isobutyl ketone, methyl ethyl ketone, or a combination of two or more of these solvents; and
   wherein the liquid composition comprises water in an amount of about 30-50% by weight of the total weight of the liquid composition.

2. The composition of claim 1 wherein the water-soluble metal salt further comprises a water-soluble, alkali, alkaline earth or rare earth metal chloride salt nitrate, or a combination of two or more of these salts.

3. The composition of claim 1 wherein the water-soluble metal salt further comprises sodium chloride, potassium chloride, calcium chloride, magnesium chloride, calcium nitrate, cerium chloride, cerium nitrate, calcium magnesium acetate, potassium formate, or sodium silicate, or a combination of two or more of these salts.

4. The composition of claim 1 wherein the evaporation enhancing agent comprises ethanol.

5. The composition of claim 1 wherein the evaporation enhancing agent comprises a volatile organic solvent.

6. The composition of claim 1 wherein the evaporation enhancing agent comprises a volatile organic solvent that forms an azeotrope with water.

7. The composition of claim 1 wherein the hydrophobic acrylic polymer comprises a copolymer of butyl acrylate and styrene.

8. The composition of claim 7 wherein the water soluble polymer comprises polyvinyl alcohol.

9. A liquid coating composition useful for providing a water-vapor permeable, air barrier membrane by coating on a construction surface, the liquid coating composition being an aqueous emulsion, comprising:
   a hydrophobic acrylic polymer, wherein the hydrophobic acrylic polymer comprises about 50% to 97% by weight based on total solids in the liquid composition;
   a water soluble polymer, wherein the water-soluble polymer comprises about 1% to 20% by weight based on total solids in the liquid composition, and wherein the water-soluble polymer comprises polyvinyl alcohol, polyethylene oxide, water soluble cellulosic polymers, hydrolyzed maleic anhydride polymers and copolymers, polyvinylpyrrolidone, sulfonated polystyrene, polysulfoethyl acrylate, poly(2-hydroxyethylacrylate), polyacrylamide, poly(acrylic acid) and alkali metal salts thereof, natural or synthetically modified polysaccharides, proteins, alginates, xanthan gums, or guar gums, or combinations of two or more of such water soluble polymers;
   an inorganic filler, wherein the inorganic filler comprises about 2-40% by weight based on total solids in the liquid composition;
   a freezing-point lowering component comprising a water-soluble metal salt, wherein the water-soluble metal salt comprises about 0.5-15% by weight of the total weight of the liquid composition, said water-soluble metal salt comprising calcium nitrite, sodium nitrite, or a mixture thereof; and
   an evaporation enhancing agent in an amount of about 0.5-15% by weight of the total weight of the liquid composition, the evaporation enhancing agent comprising at least one solvent selected from methanol, ethanol, oxybis-propanol, vinyl acetate, butyl acetate, ethyl acetate, methyl isobutyl ketone, methyl ethyl ketone, or a combination of two or more of these solvents; and
   wherein the liquid composition comprises water in an amount of about 30-50% by weight of the total weight of the liquid composition.

10. The composition of claim 9 wherein the evaporation enhancing agent comprises ethanol.

11. The composition of claim 9 wherein the hydrophobic acrylic polymer comprises a homopolymer or a copolymer of an acrylic ester having a repeating group represented by the structure —(—CH$_2$—C(R$^1$)HCOOR—)— wherein R is a C2-C8 alkyl group and R1 is H or CH$_3$.

12. The composition of claim 9 wherein the evaporation enhancing agent comprises a volatile organic solvent that forms an azeotrope with water.

\* \* \* \* \*